United States Patent [19]
Saito et al.

[11] Patent Number: 5,653,779
[45] Date of Patent: Aug. 5, 1997

[54] METHOD FOR MANUFACTURING QUARTZ GLASS COMPONENTS AND MOLDING FRAME THEREFOR

[75] Inventors: Makoto Saito; Hideki Tsuchida, both of Takefu; Eiichi Shinomiya, Tokyo; Hiroyuki Kimura, Takefu; Kimikazu Taniyama, Takefu; Norikazu Fujii, Takefu, all of Japan

[73] Assignees: Heraeus Quarzglas GmbH, Hanau, Germany; Shin-Etsu Quartz Products Co., Ltd., Tokyo, Japan

[21] Appl. No.: 492,848

[22] Filed: Jun. 20, 1995

[30] Foreign Application Priority Data

Jun. 30, 1994 [JP] Japan ................. 6-172034
Jun. 30, 1994 [JP] Japan ................. 6-172041

[51] Int. Cl.$^6$ ............... C03B 9/00; C03B 11/00; C03B 13/00; C03B 15/00
[52] U.S. Cl. ............... 65/66; 65/102; 65/DIG. 8; 65/374.15
[58] Field of Search ............... 65/66, 68, 72, 65/102, 269, 275, 286, 305, 306, 317, 318, 319, DIG. 8, 374.15

[56] References Cited

U.S. PATENT DOCUMENTS

| | | | |
|---|---|---|---|
| 3,833,347 | 9/1974 | Angle et al. | 65/32 |
| 3,874,777 | 4/1975 | Deeg et al. | 351/168 |
| 4,358,306 | 11/1982 | Okamoto et al. | 65/32 |
| 4,969,941 | 11/1990 | Kyoto et al. | 65/18.1 |
| 5,026,415 | 6/1991 | Yamamoto et al. | 65/305 |
| 5,250,099 | 10/1993 | Kubo et al. | 65/102 |
| 5,306,322 | 4/1994 | Ishikawa et al. | 65/3.12 |
| 5,417,730 | 5/1995 | Shigyo et al. | 65/111 |

FOREIGN PATENT DOCUMENTS 0581013  5/1994  European Pat. Off. .

Primary Examiner—Donald E. Czaja
Assistant Examiner—Jacqueline A. Ruller
Attorney, Agent, or Firm—Felfe & Lynch

[57] ABSTRACT

A quartz glass component having a projection on a flat face is manufactured by molding a quartz glass body at a high temperature and under high pressure. The heating temperature is set to a range of from 1800° to 2000° C. and slight pressure is applied by the female die which forms the projection, or pressure in a direction against gravity. The molding die includes a graphite frame surrounding a molding space formed by a female die and a receiving die sandwiching the quartz glass body in the graphite frame. The space between the receiving die and the female die is width-reducible, the compositions of the graphite frame and the two graphite dies are made to differ, the female die and receiving die contacting the quartz glass body during pressure molding have a plurality of gas-permeable micropores such as in sintered graphite for example and are formed by a high-purity graphite material having air permeability.

6 Claims, 4 Drawing Sheets

Fig. 2 (A)
Fig. 2 (B)
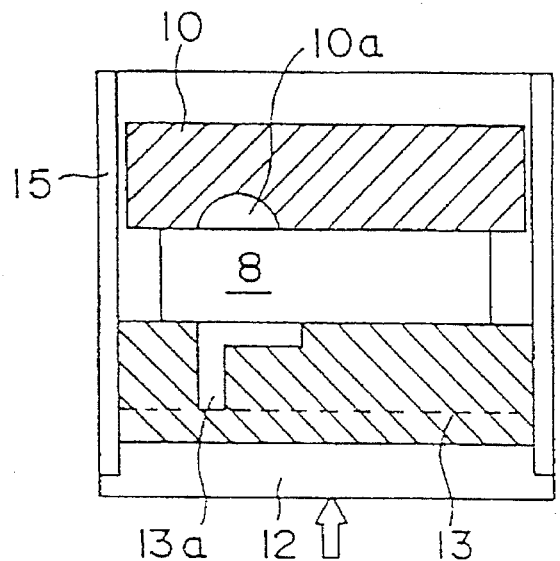
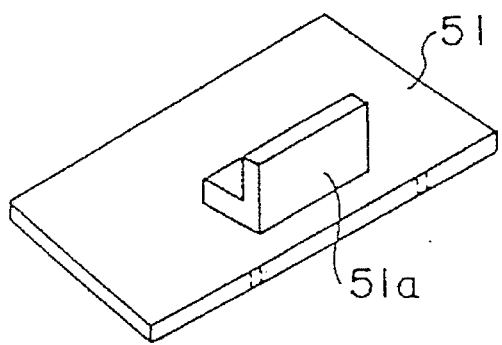
Fig. 2 (C)
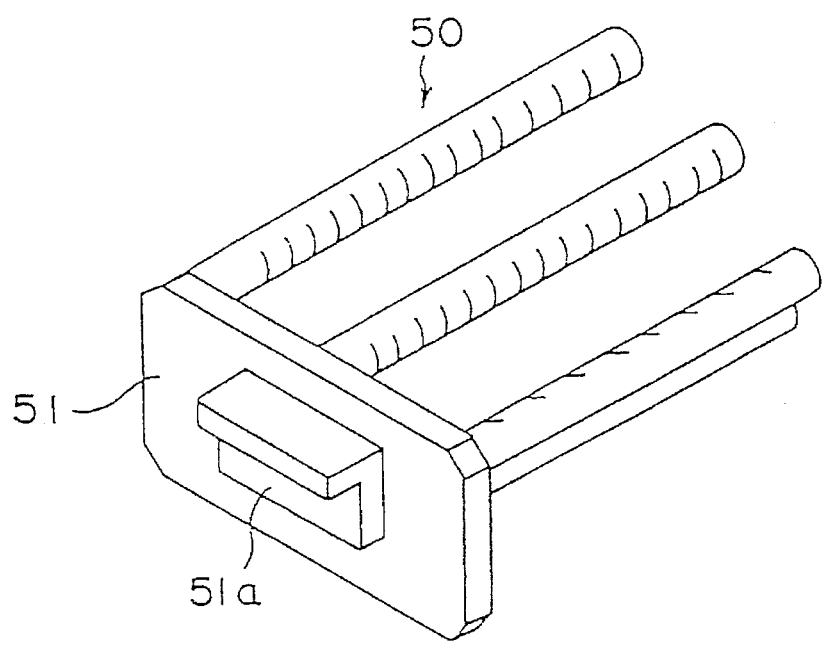

METHOD FOR MANUFACTURING QUARTZ GLASS COMPONENTS AND MOLDING FRAME THEREFOR

FIELD OF THE INVENTION

The present invention relates to a method and to a molding frame for manufacturing quartz glass components which have a projection on at least one side thereof, in particular to quartz glass components which are used in the semiconductor industry and which are often used as quartz glass jigs and parts such as flanges for reactor cores, top plate and bottom plates of vertical wafer carriers, side plates of horizontal wafer carriers and caps for reactor cores etc. This invention also relates to efficient production of quartz glass components having projections, mating sections or flanges.

DESCRIPTION OF THE PRIOR ART

For manufacturing types of quartz glass components having complex shapes, conventional methods use a procedure which includes the steps of heating a quartz welding rod by means of a burner and welding it onto a quartz glass flat plate to make padding, then machining the padded part to form a shape. Alternatively, a quartz block body may be machined to form a shape.

The padding by welding with welding rods takes a long time and, furthermore, if the adjustment of welding speed and heating temperature is not balanced, bubbles remain in the welded portion. Therefore, this work requires much skill, and performing the firing process over a long period of time degrades the working environment. In addition, the material unit requirement is high in the block machining step and machining requires a long period of time.

To solve these problems, there is a hot molding method in which the quartz glass body is heated to soften it in the molding die to form a projection. This type of molding process requires a molding temperature set at about 1750° to 1900° C. to enable precise molding of the projection, which temperature is higher than the heating and softening temperature of quartz glass, i.e. 1600° C. At such a high temperature, however, the reaction between graphite and quartz glass generates CO and $CO_2$, and further generates $SiO_2$ gas. These gases enter into the softened quartz glass, inducing the generation of bubbles and the adhesion of SiC, generated from the reaction, onto the quartz glass, and finally generates cracks when the quartz glass is cooled to room temperature owing to the difference in thermal expansion coefficients therebetween.

To cope with this phenomena, Examined Japanese Patent Publication No. 50414/1987, for example, discloses a means to release CO, $CO_2$, and $SiO_2$ vapor by adhering a graphite chamber fiber cloth to the inner face of the molding frame. According to an embodiment disclosed in this patent publication, the technique performs pressure molding by maintaining a temperature of 1850°+5° C. for 30 min. in an inert N2 atmosphere under a pressure of 0.4 kg/cm2. As a result, the adhered graphite fiber cloth releases gases such as $SiO_2$ and prevents these gases from entering the product, improving production yield.

With the above-described constitution of adhered fiber cloth, however, when the original ingot is melted and attached to the cushion material on the side wall, the available de-gassing passage is only the pore portion of the cushion material. Thus, gases are retained at the bottom. For a structure that has a projection at its bottom, which is seen in the components related to this invention, the stagnant gases lead to critical defects in the components.

To prevent these type of defects, an apparatus is provided in Unexamined Japanese Patent Publication No. 17174/1993. According to this patent publication, the heating temperature is set to a low level ranging from 1600° to 1700° C., and the apparatus conducted pressureless molding using a molding hole having a through-hole of about 3 mm diameter.

However, this type of mechanism uses a low heating temperature ranging from 1600° to 1700° C. and therefore increases viscosity. Furthermore, the process uses pressureless molding so that it is difficult to ensure full introduction of molten glass in the production part of the flat component full introduction of molten glass. As a result, high precision processing becomes impossible.

SUMMARY OF THE INVENTION

The object of the present invention is to provide a method for manufacturing a quartz glass component which enables molding of high accuracy without generating bubbles, devitrification, and cracks even when a quartz glass component having a projection is formed and also to provide a molding frame therefor.

The molding method of this invention is described below.

The heating temperature for molding is set at around 1750° to 2100° C., preferably in a range of from 1840° to 1960° C. In the case of a natural quartz glass manufactured by oxygen-hydrogen flame, the heating temperature is in a range of from 1840° to 1900° C., and in the case of a natural quartz glass manufactured by an electric melting process, the heating temperature is in a range of from 1900° to 1960° C.

The temperature range applied in the latter case of conventional technology is not so low as to lower viscosity, and molding is easily performed.

In such a case, pressureless molding may be applied. However, pressureless molding unfavorably changes the press pressure owing to the dead weight of the press-die.

On the other hand, when the press pressure is set at a large value as described above, contact between the graphite frame and the molten quartz glass becomes too strong, and there arise the problems of generation of reacted gases, devitrification resulting from the adhesion of SiC, and generation of cristobalite.

Therefore, the molding method of this invention is performed by pressure molding which applies a slight pressure ranging from 0.001 to 1 kgf/cm2 at the high temperature described above.

In addition, the molding frame of the quartz glass component is structured in such a manner that the quartz glass body is sandwiched, within a molding space having a graphite frame at the periphery thereof, between a female die at a lower side having a cavity corresponding to the projection and a receiving table of the glass body at the upper side, the receiving table is fixed, and the quartz glass body is pressure-molded while applying the above-described slight pressure from the rear side of the female die.

It is preferable that the slight pressure is applied in advance to the female die within a temperature range where the quartz glass body begins to deform, preferably in a range of from 1600° to 1650° C. and that the pressure molding is performed under heating at a high temperature level while moving the female die a specified distance along with the softening process of the quartz glass while maintaining pressure.

The pressure molding is preferably conducted such that when the heating temperature range reaches 1750° to 2100° C. of the temperature within the molding space or more, preferably 1840° to 1960° C., the position of the moving stroke of the female die is held for a specified period ranging from 5 to 20 min. depending on the shape of the projection, most preferably from 10 to 15 min. to await completion of deformation of the quartz glass. After the completion of the molding, the female die is lowered to the return direction to release the pressure.

The speed of the female die up to the end point of movement is set preferably at a slow speed of 2 to 10 mm/min., and most preferably from 3 to 5 mm/min. The temperature increase speed is set preferably to a range of from 35° to 183° C./min. to promptly reach the heating temperature of 1750° to 2100° C.

After the completion of molding of the quartz glass body, the work table is lowered to the exterior of the furnace while holding the temperature inside the furnace at a specified level. Then, the molding frame is brought out onto the cooling table, and the top face is sealed and left to stand with a quartz glass cap to avoid quick cooling.

The molding frame consists of a graphite frame which encloses the molding space, a female die corresponding to the projection via the quartz glass body within the graphite frame, and a receiving table. The graphite frame and the two graphite dies preferably have different compositions to each other.

This invention performs molding by setting the heating temperature to a range of from 1750° to 2100° C., which is higher than the conventional level, and by applying slight pressure from the female die which forms the projection, or applying pressure in a direction against gravity. Therefore, press pressure does not change owing to a dead weight, such as is seen in the case of pressureless molding. In addition, since the press pressure is at a low level, contact between the graphite frame and the molten quartz glass is not excessive, and devitrification caused by the generation of reacted gases and adhesion of SiC are prevented.

The conventional technology first cited above disclosed a method of performing pressure molding by applying a molding pressure from both facing sides of the mother material. However, with this type of method, particularly at a slight pressure, precise molding cannot be expected because the press pressure resulting from the dead weight of the upper side press-die is likely to vary.

According to the present invention, the female die is located at the lower position to directly enter into the softened quartz glass body. As a result, precise projection molding can be performed.

Since the receiving table located at the upper side of the molding frame is subjected to a fixed pressure, pressure relief is needed only at the lower side of the furnace where the female die is operated for moving while not opening the upper side of the furnace.

As a result, in a conventional structure where the upper side of the furnace is opened, the temperature inside the furnace is lowered to near room temperature at every opening, and the time taken to raise the temperature in the succeeding molding stage significantly increases. Conversely, in the mode wherein the lower side of the furnace is opened, the high temperature atmosphere remains in the furnace, so the method is absolutely isolated for a unit which conducts continuous molding.

In this case, the slight pressure which is applied to the female die is impressed in advance from a temperature range before the start of deformation of the quartz glass body. Accordingly, molding gradually proceeds along with heating and softening, so that precise molding is performed.

Furthermore, this invention provides easy and precise molding through the process that, when the temperature within the molding space reaches a range of from 1750° to 2100° C., the position of the moving stroke of the female die is held for a specified period to await the completion of deformation of the quartz glass while allowing a slight movement of the female die under slight press pressure. As a result, even when the projection has a complex shape, molding is conducted easily and precisely.

By lowering the female die in the return direction immediately after completion of the molding to release pressure, contraction generated in the molding frame caused by the difference in thermal expansion coefficients during the temperature-lowering stage can be absorbed by the receiving table side that is subjected to a fixed pressure, so that no breakage of the molding frame occurs.

After completing the molding of the glass body, the work table is lowered to a position outside the furnace while holding the temperature inside the furnace at a specified level, then the molding frame is sealed and left to stand with a quartz glass cap to cool gradually and avoid rapid cooling.

It is preferred that the molding frame is rapidly heated at a speed of 35° to 183° C./min. That range of heating speed is preferred in order to suppress generation of reacted gases and devitrification caused by the adhesion of SiC. Nevertheless, to enable molding of a complex projection shape with high precision without generating ductility, the speed of the female die is preferably set to 10 mm/min. or less, and most preferably at 5 mm/min. or less.

In this case, a speed of 2 mm/min. or less requires an unnecessarily long molding time, so the lower limit of this speed is set at 2 mm/min.

According to the method of this invention in which a flat plane component having a projection is molded while applying press pressure from the female die, the female die and the receiving table contact the quartz glass body throughout the course of pressure molding, as seen in FIG. 2 and FIG. 3. Accordingly, only the contact face of the press-die generates CO, CO2, and SiC vapor due to the reaction with the quartz glass.

Even when the heated glass body generates SiO2 vaporized gas in the vicinity thereof, the quartz glass body does not contact the peripheral graphite frame until immediately before the completion of molding, therefore a gas release means is not required.

Therefore, the gas release passage need only be formed on the pair of press-dies. In the graphite fiber cloth used in the above-described conventional technique, it is impossible for the cloth to deform corresponding to the shape of the projection on the female die.

On the other hand, the material as cited in the latter conventional technique raises no problems at a high temperature range of from 1600° to 1700° C., which gives a high viscosity of quartz glass. However, when the material is heated to 1900° C., the viscosity of the quartz glass considerably decreases and irregularities occur on the surface of the molded quartz glass component.

Therefore, this invention forms a press-die using a material in which the graphite itself has permeability, such as sintered graphite.

Near the completion of molding of the quartz glass body, swelling from the outer peripheral surface of the softened quartz glass body is impressed on the inner wall surface of the graphite frame. Accordingly, the flexural strength of the graphite frame is set at a far higher level than that of the press-die.

In the following the molding frame according to the invention is specified.

This molding frame for manufacturing quartz glass articles having projection and indentation portions on flat surfaces, comprises a graphite frame surrounding a molding space, and an opposing pair of graphite dies sandwiching the quartz glass body within the graphite frame and corresponding to the projection and indentation portions. The molding die for a quartz glass body is formed so that the spaces between the opposing graphite dies is reducible, the compositions of the graphite frame and the pair of graphite dies are made to differ.

The female die and the receiving table which contact the quartz glass during the pressure stage are made of a permeable high-purity graphite having many gas-permeable micropores, such as sintered graphite for example, the gas permeability of which is 0.1 cm2/sec or more (value of P:1.5 kgf/cm2), the compression strength of which is 100 kgf/cm2 or more, preferably 150 to 600 kgf/cm2, and the Shore hardness of which is 10 or more, preferably approximately 15±2, When approaching completion of the quartz glass body molding, the graphite material in the pressurized graphite frame which contacts the outer peripheral surface of the enlarged quartz glass body is formed with a bending strength several grades greater than the opposed pair of graphite dies (herebelow referred to as pressing dies).

In this case, the apparent density of the pressing dies is set at 1.5 g/cm3 or less, preferably 1.2±0.2 g/cm3 and the bending strength thereof is set at 30 kg/cm2 or more, preferably from 50 to 300 kg/cm2.

Also, the graphite purity of the pressing dies may be set at a higher purity than the purity of the quartz glass body; specifically, each of the metal elements which cause semiconductor poisons and cristobalite layering, such as Na, K, Li, Ca, Mg, Fe, etc., is set to 0.1 to 0.2 ppm or less.

Further, the press pressure applied to the pressing dies is set to a range of 0.01 to 0.1 kgf/cm2, and the average particle size of the graphite forming the pressing dies is set to 30 to 150 µm, preferably 50 to 100 µm.

Also, the pressing dies are formed by assembling a plurality of one or more parts, easy removal of the glass body from the pressing dies is possible, and these may be set so as to prevent destruction of the graphite dies.

Also, in a molding die used in an apparatus for molding quartz glass articles by means of high temperature pressure molding, a run-off portion which energizes press pressure from one of the opposing pair of graphite dies is provided in a predetermined position at the side of another of the opposing pair of graphite dies.

In the method for molding flat articles having projections and indentations while sandwiching the quartz glass body between the opposing pair of pressing dies and width-reducing the opposing pressing dies as in the above molding method, as shown in FIG. 1, the opposing pair of pressing dies continuously contact the quartz glass body during pressure molding and consequently only the contact face of the pressure die generates CO, CO2, SiC etc. due to the reaction with the quartz glass.

On the other hand, although the material as cited in the latter prior art technique, which is perforated with air pores of about 3 mm, does not give rise to problems at high temperatures of from 1600° to 1700° C. at which the quartz glass has high viscosity, when the material is heated to 1900° C., the viscosity of the quartz glass considerably decreases and irregularities are generated in the surface of the molded quartz glass articles.

The present invention forms pressing dies using a material in which the graphite itself has a permeability as in sintered graphite.

In other words, a pressing die provided with gas-permeable micropores having gas permeability of 0.1 cm2/sec. (value of P:1.5 kgf/cm2) or more, preferably about 0.9 cm2/sec., is used.

Also, although a graphite material of an apparent density of 1.5 g/cm3 or less may be used, if the apparent density is too low destruction or deformation will occur during pressure molding. Thus it is preferably set at 1.2±0.2 g/cm3.

In addition, in molding with good precision and without destruction and deformation occurring during pressure molding, it is necessary to set the compression strength at 100 kgf/cm2 or more, preferably 150° to 600 kgf/cm2 and the Shore hardness to 10 or more, preferably about 15±2.

Meanwhile, near completion of the molding of the quartz glass body, the expansion from the outer peripheral surface of the softened quartz glass body adheres to the inner wall surface of the graphite frame, therefore the bending strength of the graphite frame must be several grades higher than that of the pressing dies. In this case, since the bending strength of the pressing dies may be set at 30 kg/cm2 or more, preferably 50 to 300 kg/cm2 each, the bending strength of the graphite frame must be more than that, specifically about 35 to 900 kg/cm2.

Since the pressing dies continuously contact the quartz glass body during pressure molding, when impurities due to this contact exist on the side of the graphite, semiconductor poisons and a cristobalite layer appear on the surface of the quartz glass body in proportion to the amount of impurities, causing generation of devitrification and cracks.

Here, the metallic elements Na, K, Li, Ca, Mg, Fe, etc., which cause semiconductor poisons and cristobalite layers, are each set to 0.1 to 0.2 ppm.

Also, a reaction occurs without fail under high temperatures, even with the above structure.

In the present invention, while applying press pressure to one of the opposing pressing dies, as well as setting this pressure to a low pressure range of 0.01 to 0.1 kgf/cm2, the contact surface area of the quartz glass body and the graphite was reduced while maintaining a precise molding process by setting the average particle size of the graphite for forming the pressing die to 30 to 150 µm, preferably 50 to 100 µm, to control the reaction thereof.

Also, by applying a press pressure from one of the opposing pair pressing dies in an apparatus for molding quartz glass articles comprising indentations and protrusions on one flat surface, softened quartz glass easily flows into indented portions thereof, and preferably, when adopting such a structure, dragging of the glass body at the side located at the rear surface side (other side) of the portion which has flowed into a concave portion of the graphite die is generated, and indentations occur.

BRIEF DESCRIPTION OF THE DRAWINGS

FIG. 2(A) is a cross sectional view of the molding frame and FIG. 2(B) is a perspective view of the molded shape specifically showing the side plate of a horizontal boat which is shown in FIG. 2(C).

EMBODIMENTS

The present invention is described in more detail in the following, with reference to an embodiment. Nevertheless, size, material, shape, relative positioning thereof, etc. described in the embodiment are given only for explanation and are not intended to limit the scope of the invention unless otherwise specified.

The following is a description of a molding apparatus using the molding frame described below.

Figure 1:
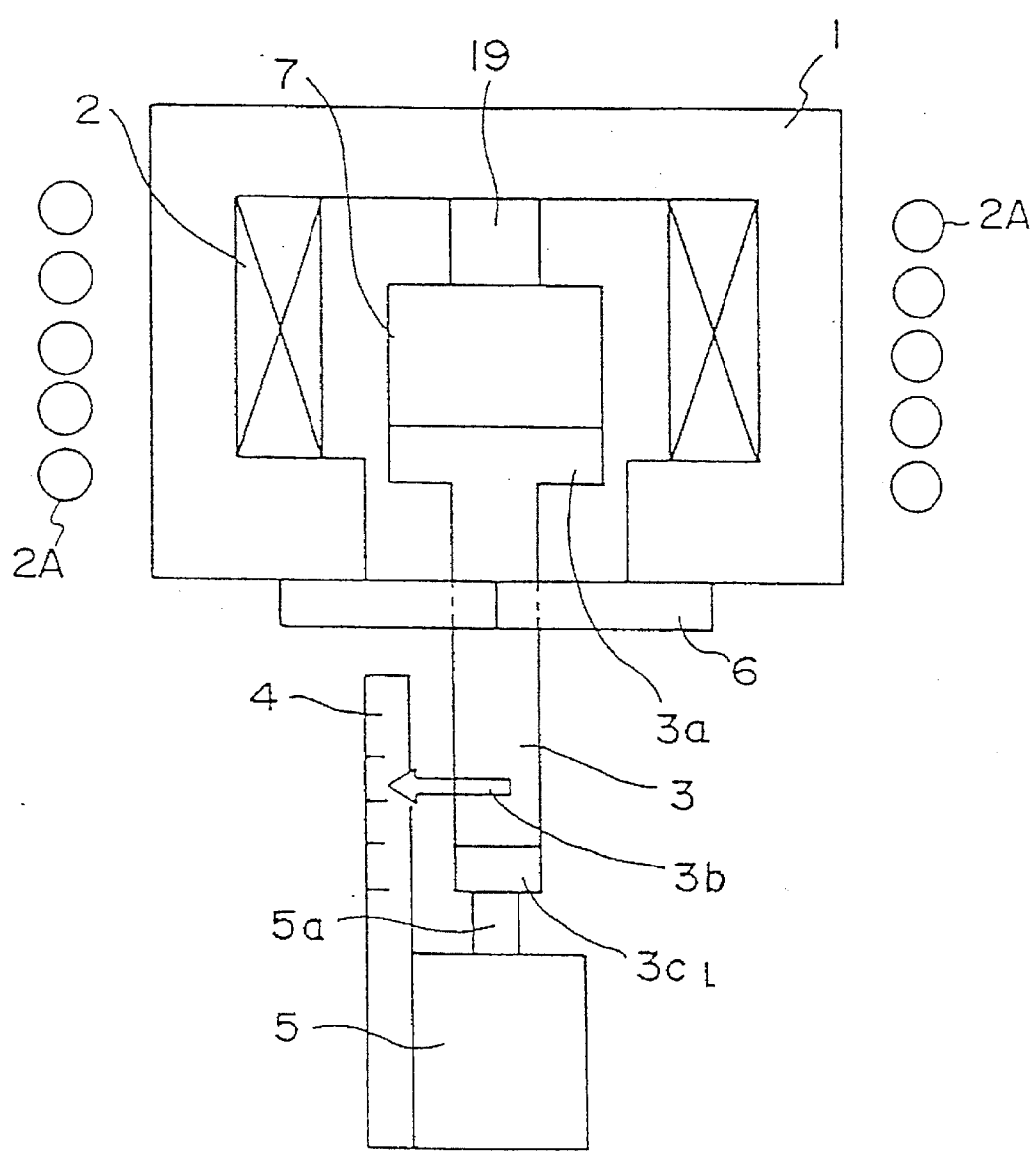
FIG. 1 shows a schematic drawing of the heating molding apparatus for a quartz glass body of this invention.

FIG. 1 shows a basic structure of the molding equipment for molding quartz glass components of this invention. The lower side of the apparatus is left open, and the graphite casing (1) in a shape of a gate contains a graphite heater (2) which is located on the inner periphery thereof and is heated by the electromagnetic action of an electromagnetic induction heating coil (2A). The heater (2) is controlled by the induction heating coil (2A) using an external thermometer and other control means (not shown) to control the inside temperature to a specified level.

A movable press rod (3) which is provided with the work table at its top is made of graphite, and the lower end thereof is connected to the piston (5a) of the hydraulic cylinder (5). The movable press rod (3) moves vertically, driven by the piston (5a) via the load cell (3c).

The molding frame (7) is placed on the work table (3a), and is urged upward by the driving action of the hydraulic cylinder (5). By contacting the upper face of the receiving table (10) at the upper side of the molding frame (7) with the stationary press rod (19), the molding frame (7) is pressed from both the upper side and the lower side.

The stationary press rod (19) is made of graphite and fixed to the casing (1).

The load cell (3c) which is located between the piston (5a) of the hydraulic cylinder (5) and the movable press rod (3) is formed so as to perform measurement of the pressure applied during the pressing stage.

The scale (4) stands along the side of the hydraulic cylinder (5) to confirm the distance to which the movable press rod (3) ascends using the needle (3b) which extends horizontally from the side of the press rod (3).

As a result, the amount of change in the press pressure of the movable press rod (3) against the molding frame (7) is visually confirmed through observation of the needle (3b) on the scale (4). Completion of molding is visually checked by confirmation of the position of the needle (3b).

Detection of completion of molding is also possible by converting the distance by which the needle (3b) has moved into an electric signal such as a change resistance or capacitance of a capacitor and by operating a lamp or buzzer.

The lower inlet part of the casing (1) has a shutter (6) to allow the casing (1) to close. The shutter (6) is made of a heat-resistive carbon felt, and is formed to allow the casing (1) to open and close along the bottom face thereof using an air cylinder (not shown) or the like.

After closing the shutter (6), the atmosphere of the casing (1) is replaced with an inert gas ($N_2$, Ar, or He) using an apparatus not shown in the drawing.

The movable press rod (3), the hydraulic cylinder (5), and the scale (4) are configured so as to move integrally and vertically to enter into and exit from the casing (1) by means of a lift apparatus (not shown). Thereafter, they descend using the lift equipment after the shutter (6) is opened, and the work table is withdrawn from the casing (1) to allow replacement of the molding frame (7).

FIG. 2(A) shows an example of the shape of the molding frame. FIG. (2B) illustrates the structure of a molding frame which conducts pressure molding of a side plate (51) of a horizontal boat (50) as shown in FIG. 2(C). Such horizontal boats are used in semiconductor processing for supporting wafers. For the wafer support four slotted quartz glass rods (52) are welded on the plate (51). A female die (13) has a concave portion (13a) opened at the top thereof corresponding to a projection (51a) of the side plate (51).

That is, as shown in FIG. 2(A), within a rectangular graphite frame which forms a molding space and which consists of a graphite frame (15) made of dense graphite and a bottom plate (12), the female die (13) which has the concave portion (13A) corresponding to the projection (51a) via a quartz glass body (8) and the receiving table (10) are located. The distance between the receiving table (10) and the female die (13) is reducible, and the outside diameter of the receiving table (10) and the female die (13) is set slightly smaller than the inside diameter of the square graphite frame (15).

An arm-shaped draft (10a) is located at a specified position on the receiving table (10) corresponding to the concave portion (13a) of the female die (13). The draft (10a) is set with a capacity equivalent to or larger than that of the concave portion (13a) of the female die (13).

The female die (13) and the receiving table (10) are formed in a thick shell structure in order to endure compressive stress under press loading conditions. The graphite frame (15) is formed in a thin shell square frame to achieve good heat absorption.

Figure 3:
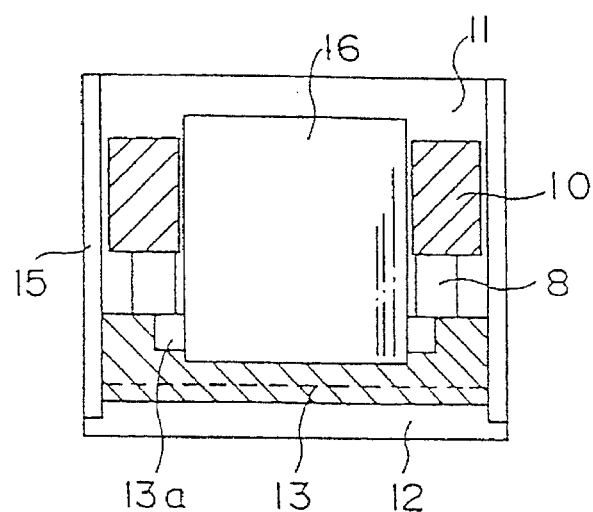
FIG. 3(A) is a cross sectional view of the molding frame and FIG. 3(B) is a perspective view of the molded shape specifically showing the flange portion of the furnace core tube which is shown in FIG. 3(C).
Figure 3:
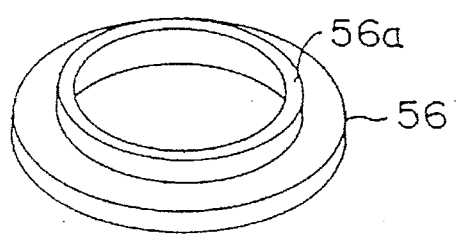
Figure 3:
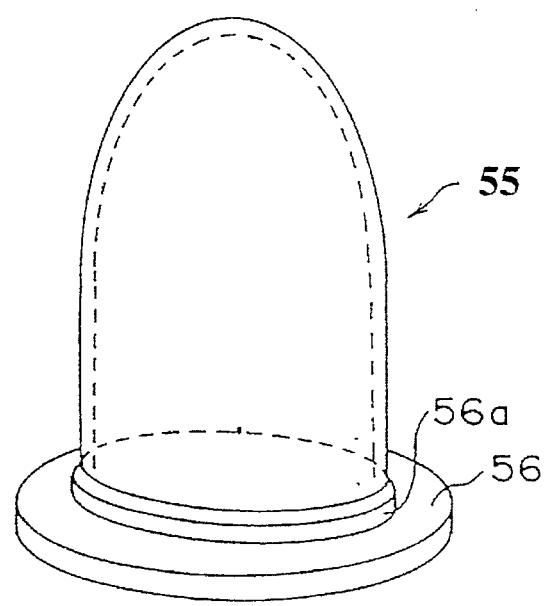

FIG. 3(A) shows an example of another shape of the molding frame. As seen in FIG. 3(C), the quartz glass component of this example has a projection (56a) and a flange (56), for example, of the vertical furnace core tube (55).

The molding frame is provided with, as shown in FIG. 3(A), a tubular graphite frame which forms the molding space (11) enclosed by the dense graphite tube (15) and the bottom plate (12). The tubular graphite frame has the female die (13) having a cavity (13a) corresponding to the projection (56a) of the quartz glass body (8), and also has a receiving table (10). The distance between the receiving table (10) and the female die (13) is reducible, and the outside diameter of the receiving table (10) and the female die (13) is set at slightly smaller than the inside diameter of the tubular graphite frame (15).

A core pillar (16) is attached to the female die (13) to locate a center hole (56d) on the flange (56). However, the center hole (56d) may be machined after completion of molding, and this hole is not necessarily required.

For both examples described above, the graphite forming the female die (13) and the receiving table (10) has micropores with a gas permeability of 0.1 cm2/sec or more (at P=1.5 kgf/cm2), most preferably about 0.9 cm2/sec, a bulk density of 1.5 kg/cm2 or less, most preferably at 1.2 kg/cm2, a compressive strength of 100 kgf/cm2 or more, most preferably around 160 kgf/cm2, a Shore hardness of 10 or more, most preferably about 15, a flexural strength of 30 kgf/cm2 or more, most preferably about 69 kg/cm2, and a specific resistance of 40 μΩ/cm.

The graphite purity is set to 0.1 ppm or less for each of the elements of Na, K, Li, Mg, Ca, Cu, Al, and 0.15 ppm or less for Fe. The graphite is produced to a higher purity than the purity of the quartz glass being molded. The graphite for the receiving table (10) and the female die (13) is prepared by sintering or another method. In this case, the average particle size of the graphite is preferably set to a range of from 30 to 150 microns, most preferably from 50 to 100 microns.

On the other hand, the dense graphite forming the graphite frame (15) and the bottom plate (12) is set to have a bulk density of 1.8 to 1.9 g/cm3, a compressive strength of 700 to 1050 kgf/cm2, a Shore hardness of 50 to 90, a flexural strength of 370 to 900 kg/cm2, and a specific resistance of 0.9 to 1.8 μΩ/cm.

It is preferred to form the projection (13b) and core pillar (16) which are attached to the female die (13) with the same material as that of the female die (13). Nevertheless, this is not an absolute condition because they are not always in contact with each other.

According to the present embodiment, since the graphite material itself of the concave die (13) and the pressing die (10) which continuously contact the quartz glass body (8) during pressure molding is formed using a material having permeability to air, gases of CO, CO2, SiC, etc. which are produced by the reaction of the quartz glass and the graphite can be readily released outside the molding space. Also, being able to readily release the gases of CO, CO2, SiC, etc. outside the molding space prevents silicon carbide being generated in the glass surface, and further, as well as solving the defects of cracks being generated after cooling due to differences in heat expansion, and deterioration of yield, the defects of deterioration of slippage between the dies and the glass arising from adhesion of silicon carbide and inability of the glass to enter fine portions of the dies can be solved.

Also, where devitrification (crystallization) arising in impurities in the contact surfaces contacting the dies (10) and (13) and the glass body (8) occurs, although slippage between the dies (10) and (13) and the glass body (8) deteriorates and molding becomes difficult, because the purity of the concave die (13) and the pressing die (10) has been set higher than the purity of the surface of the quartz glass body (8), this defect is prevented. Also, with this structure reaction definitely occurs at high temperatures.

In the present embodiment the contact surface area of the quartz glass body (8) and the graphite can be reduced while maintaining precise molding processing by applying press pressure on the concave die (13) side and setting this press pressure at a low pressure in the range of 0.01 to 0.1 kgf/cm2.

Also, in a molding apparatus for molding quartz glass articles having a protruding portion (17a) on one flat surface thereof the application of press pressure from the rear surface side of the concave die (13) makes it easier for the softened quartz glass to flow into the concave portion of the concave die (13), and although this is preferable, this type of structure leads to dragging of the glass body opposing the pressing die (10) which is located at the rear surface side of the portion which has flowed into the female portion, and an indentation occurring.

The indentation of the glass body at the side opposing the pressing die (10) can be prevented by providing a run-off portion (10a) at a predetermined position of the pressing die (10) facing the concave portion of the concave die (13), specifically, providing a run-off portion (10a) whose volume is set equivalent to or slightly greater than the concave portion of the concave die (13) and performing molding while collecting the softened quartz glass.

In this case, although the run-off portion (10a) becomes a protrusion after completion of molding, it may be cut by machining thereafter.

Also, although press pressure is applied via a hydraulic cylinder to the molding frame from the rear surface side of the concave die (13) via the bottom plate (12), in such a case if the press pressure is too large the softened quartz buckles, abnormal deformation occurs and air bubbles are included, therefore care is necessary.

Since the present embodiment sets the heating temperature to a high temperature of from 1840° to 1960° C., if the pressure is set high, contact between the concave die (13) etc. and the molten quartz glass is too strong and problems occur due to generation of reaction gases, devitrification by adhesion of SiC, and generation of cristobalite layers. Here, in the present embodiment the press pressure is set to a press pressure of 0.01 kg/cm2 to 0.1 kg/cm2.

Also, the press pressure may be applied from a temperature region prior to softening and deformation of the quartz glass body (8), i.e. from before 1600° C., and the deformation speed of the glass differs due to the press pressure and/or the melting press temperature, the result of an experiment being 0.07 mm/min. to 8 mm/min., preferably 0.07 mm/min. to 5 mm/min.

The existence of such inconsistencies is due to, in the case of continuous operation, the deformation speed of the glass being (10) times greater after the second cycle where residual heat exists compared to the first cycle which starts from normal temperature. This is because the temperature inside the furnace after the second cycle is maintained at 1600° C., already in the vicinity of the melting press temperature.

The following is a description of the molding procedure using the apparatus described above.

Figure 4:
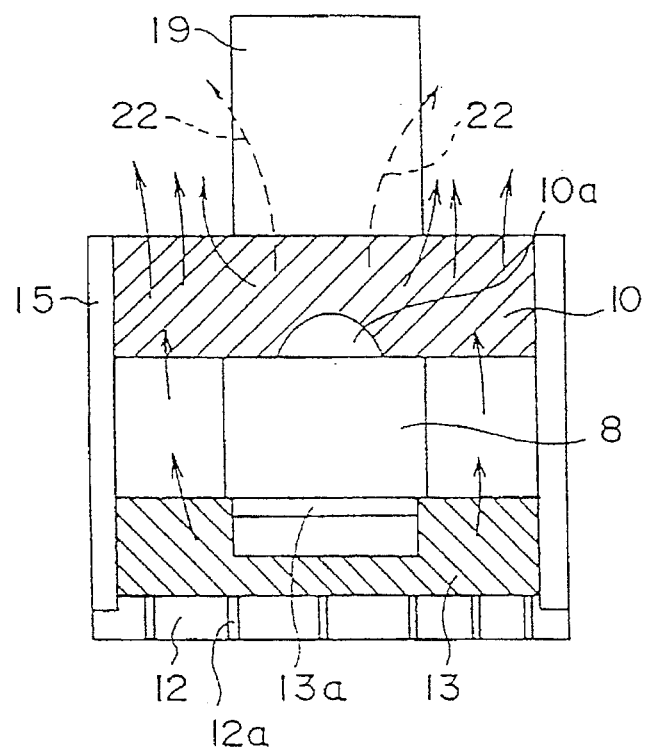
FIG. 4 shows the molding frame of FIG. 2 in a pressing state.

In the state shown in FIG. 1, the shutter (6) is opened. By operating the lift apparatus (not shown), the movable press rod (3), the hydraulic cylinder (5), and the scale (4) are integrally lowered. As shown in FIG. 2(A), FIG. 3(A), and FIG. 4, the molding frame (7) with the quartz glass body (8) placed thereon is mounted on the work table (3a), which is then raised into the casing (1) until the top face of the receiving table (10) substantially touches the stationary press rod. In this state, a press pressure of 0.03 to 0.04 kgf/cm2 is applied to the quartz glass body (8) using the hydraulic cylinder (5) via the bottom plate (12) and the female die (13).

After closing the shutter (6), the casing (1) is sealed. The inert gas N2 is introduced to the casing (1) to approximately 1 atmosphere.

The graphite heater (2) is heated via the induction heating coil (2A) to conduct a rapid temperature rise of the molding space at 35° to 55° C./min., most preferably at 45° to 50° C./min. while determining the time of temperature rise by a thermometer (not shown). Heating deformation begins at around 1650° C. The hydraulic cylinder is raised to maintain the press pressure in a range of from 0.03 to 0.04 kgf/cm2.

In this case, the ascending speed of the hydraulic cylinder is kept in a range of from 2 to 10 mm/min., most preferably from 3 to 5 mm/min., while watching the speed on the scale.

The completion of molding is confirmed when the female die ascends to its top dead center (maximum ascent point)

which is checked by the scale and by whether the molding temperature has risen to 1840° to 1960° C. At the point of completion of molding, this position is held for 5 to 20 min. The distance to the maximum ascent point (stroke) is determined in advance by calculation.

During the molding stage, gases such as CO, CO2, SiO and SiC which are generated by the reaction between the quartz glass and the graphite are, as shown in FIG. 4, released to the molding space along the arrow route through the air passage in the receiving table (10) and the air passage in the female die (13).

In this case, the bottom plate (12) may have a plurality of through-holes to enhance the efficient release of gasses through the air passage of the female die (13), or the female die (13) may also be used as a bottom plate (12) without adding the above bottom plate (12).

Figure 5:
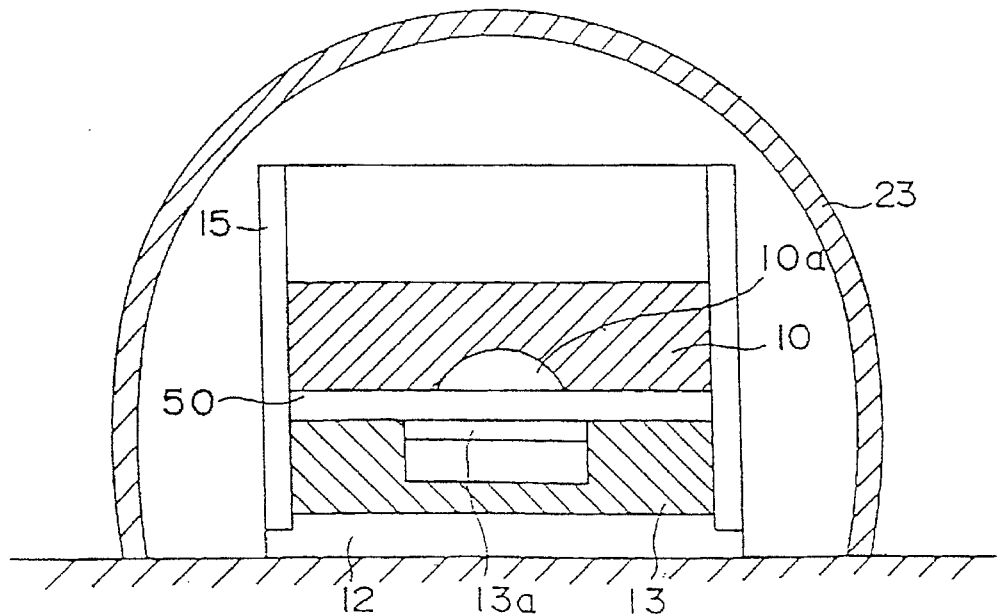
FIG. 5 shows the molding frame of FIG. 2 with the quartz cap.

The completion of displacement of the quartz glass is detected by watching the needle (3b) which indicates the measure on the scale (4) after the position-holding step and by using an algorithm prepared in advance to give displacement. Then, the shutter (6) is opened, and the work table (3a) is lowered using the lift apparatus (not shown). The molding frame (7) is taken out from the table (3a) in a hot state and transferred to the cooling table (not shown). As seen in FIG. 5, a quartz cap (23) is used to prevent oxidation of the graphite.

Since the press pressure is applied even during the period of position-holding time, the scale measure indicated by the needle (3b) rises slightly. Consequently, completion of deformation of the quartz glass body (8) can be automatically detected through observation of the ascent speed of the needle (3b).

After holding the temperature at 1150° C. for 30 min., gradual cooling and annealing are performed to form a shape. Machining is applied to remove burrs, and the top plate (17) is manufactured.

On the work table, after transferring the molded shape to the cooling table, the next molding frame is mounted, and molding is performed following a similar procedure to that described above.

Since the molding space is in a heated state at that moment, a high temperature rising speed in a range of 129° to 183° C./min. is available.

On and after the second cycle of molding, the temperature in the furnace is maintained at an approximate range of from 1500° to 1600° C., which is close to the glass melting point. Therefore, the temperature in a pre-pressuring state described in the phrase "the female die is pressurized in advance from the temperature range before the quartz glass body begins to deform" is approximately in a range of from 1500° to 1600° C.

As for the material of quartz glass, experiment results gave slightly different properties between quartz glass obtained from the oxygen-hydrogen melting process and that obtained from the electric melting process.

For both processes, the speed of temperature rise to produce a favorable quartz glass component was 46.5° C./min. for the first cycle and 129° to 183° C./min. for the second cycle. For other conditions, however, these differed in each process to manufacture a mold of quartz glass component having a favorable quality. In the oxygen-hydrogen melting process, the melt press temperature was 1860° C., the holding time was 10 min., the deformation speed was 4 mm/min., and the press pressure was 0.03 kg/cm2. On the other hand, in the electric melting process, the melt press temperature was 1950° C., the holding time was 15 min., the deformation speed was 3 mm/min., and the press pressure was 0.04 kg/cm2.

According to the example, the contact surface area between the quartz glass body (8) and the graphite is minimized while performing precision molding by applying press pressure on the female die (13) side and by setting the press pressure in a low pressure range of from 0.01 to 0.1 kgf/cm2.

In a molding apparatus for molding a quartz glass component which has a projection (17a) on one side of flat plane, the application of press pressure from the rear side of the female die (13) makes it easier for the softened quartz glass to flow into the concave portion of the female die (13). This mode is preferable, but this structure forms a concave portion on the face facing the receiving table (10) which is positioned at the rear side of the female die (13) with a volume corresponding to the quantity of quartz glass, and a sag appears.

The formation of a concave portion on the side facing the receiving table (10) is prevented by forming a draft (10a) at a specified position on the receiving table (10) corresponding to the concave portion of the female die (13), or in concrete terms, by forming a draft (10a) which has the volume of the concave portion of the female die (13) or a volume slightly larger than that of the concave portion of the female die (13), and by carrying out molding while collecting the softened quartz.

In this case, the draft (10a) becomes convex after completion of molding. The convex portion may be cut by machining.

Press pressure is applied to the molding frame from the rear side of the female die (13) via the bottom plate (12) using the hydraulic cylinder. Excessive press pressure induces buckling of the softened glass, or induces abnormal deformation to generate inclusion of bubbles, so care should be taken.

In addition, this example sets the heating temperature to a high level ranging from 1840° to 1960° C. Therefore, when the press pressure is set to a high level, the contact between the female die (13) and the molten quartz glass becomes too strong, and the problems of generation of reacted gases, devitrification caused from the adhesion of SiC, and formation of a cristobalite layer arise. As a result, in this example the press pressure is set in a range of from 0.01 to 0.1 kg/cm2.

The press pressure is preferably applied prior to from the temperature range before softening and deforming of the quartz glass body (8), or a temperature level of 1600° C. or lower. The preferable value of glass deformation speed depends on the press pressure and/or the glass melting temperature, and an experiment specified the range of from 0.07 to 8 mm/min., most preferably from 0.07 to 5 mm/min.

The inconsistency of press pressure values caused by the fact that continuous operation needs to heat the work from room temperature for the first cycle and that the second cycle and succeeding cycles increase the speed of glass deformation to ten times the speed in the first cycle or more owing to the already heated furnace. The temperature inside the furnace is maintained at an approximate range of from 1500° to 1600° C., which is near the glass melting point, during and after the second cycle.

The maintaining of the temperature inside the furnace is assured also by positioning the entrance to the casing (1) at the bottom thereof to hold the high temperature within the molding space.

The female die (13) and the receiving table (10) which are kept in contact with the quartz glass body (8) during pressure molding are made of a graphite which has air permeability. Accordingly, gases such as CO, $CO_2$ and SiC which are generated by the reaction between the quartz glass and the graphite are easily released from the molding space.

Easy release of gases such as CO, $CO_2$, and SiC to the outside of the molding space prevents the formation of silicon carbide on the glass surface, solves the disadvantages of crack generation after the cooling step caused by differences in thermal expansion coefficients, degrading the production yield, worsened sliding ability between the die and the glass caused by adhesion of silicon carbide, and glass not being able to enter fine portions.

Effect of the Invention

As described above, according to the present invention, a quartz glass component which allows precise molding is manufactured and allows easy performance of continuous molding even in the case where a quartz glass having a projection is formed. Therefore, the method and molding frame of this invention are extremely practical.

We claim:

1. A method for manufacturing quartz glass components comprising: pressure molding of a quartz glass body at a high temperature to form a quartz glass component having a projection on a flat surface thereof; wherein the quartz glass body is sandwiched within a molding space having a graphite frame at the periphery thereof between a female die at a lower side thereof having a cavity corresponding to the projection and a receiving table of the glass body at an upper side thereof, the receiving table is fixed, and the quartz glass body is pressure-molded while raising the female die and applying pressure ranging from 0.001 to 0.2 $kgf/cm^2$ at a temperature ranging from 1750° to 2100° C. from a rear side of the female die, wherein the female die and the receiving table are made of high purity graphite which has gas-permeable micropores and a gas permeability of 0.1 $cm^2/sec$ or more as determined at P=1.5 $kgf/cm^2$.

2. A method for manufacturing quartz glass components according to claim 1, wherein pressure is applied to the female die at a temperature range from before the quartz glass body begins to deform, and pressure molding is performed at a high temperature while raising the female die a specified distance according to the softening of the quartz glass while maintaining the applied pressure.

3. A method for manufacturing quartz glass components according to claim 1 comprising: holding a moving stroke position of the female die for a specified period at a point where a temperature within the molding space reaches a range of about 1750° to 2100° C. to await completion of deformation of the quartz glass body, and wherein the female die is lowered to a return direction after completing the deformation, to release pressure.

4. A method for manufacturing quartz glass components according to claim 1, wherein a speed at which the temperature of the glass body rises is set to a range of from 35° to 183° C./min. and a speed at which the female die moves is set to a range of from 2 to 10 mm/min.

5. A method for manufacturing quartz glass components according to claim 1, wherein the female die and the receiving table are made of high purity graphite which has, a compressive strength of 100 kgf/cm2 or more, and a Shore hardness of 10 or more, and wherein the graphite frame is formed by graphite which has a significantly higher flexural strength than that of the female die and the receiving table.

6. A method for manufacturing quartz glass components according to claim 1, wherein the molding frame is placed on a work table which freely ascends and descends, and wherein, after completing molding of glass body, the work table is lowered to a position outside a furnace while maintaining the temperature of the furnace.

* * * * *

UNITED STATES PATENT AND TRADEMARK OFFICE
CERTIFICATE OF CORRECTION

PATENT NO. : 5,653,779
DATED : August 5, 1997
INVENTOR(S) : Saito et al.

It is certified that error appears in the above-identified patent and that said Letters Patent is hereby corrected as shown below:

Column 2,
Line 15, change "production" to -- projection --.
Line 25, delete "The molding method of this invention is described below."
Lines 34-35, delete "of conventional technology".

Column 6,
Line 21, after "150" delete the degree symbol "º".

Column 8,
Line 14, delete "as shown in FIG. 2(C)".

Column 13,
Line 15, delete "Effect of the Invention".

Signed and Sealed this

Twentieth Day of August, 2002

Attest:

JAMES E. ROGAN
Attesting Officer    Director of the United States Patent and Trademark Office